United States Patent [19]
Schutz

[11] Patent Number: 5,908,129
[45] Date of Patent: Jun. 1, 1999

[54] PLASTIC VENT VALVE FOR CONTAINERS

[75] Inventor: Udo Schutz, Selters/Westwerwald, Germany

[73] Assignee: Protechna S.A., Fribourg, Switzerland

[21] Appl. No.: 09/024,303

[22] Filed: Feb. 17, 1998

[30] Foreign Application Priority Data

Feb. 17, 1997 [DD] German Dem. Rep. ........ 29702772 U

[51] Int. Cl.⁶ .................................................. B65D 51/16
[52] U.S. Cl. ..................... 220/203.11; 220/303; 220/374; 220/370; 220/203.28
[58] Field of Search .......................... 220/203.11, 203.12, 220/203.15, 203.16, 203.18, 203.19, 203.28, 303, 254, 361, 363, 360, 367.1, 369–374, 747; 215/260

[56] References Cited

U.S. PATENT DOCUMENTS

| 2,622,762 | 12/1952 | Parsons | 220/203.11 |
| 3,179,122 | 4/1965 | Wasdell | 220/203.16 X |
| 4,091,179 | 5/1978 | Szabo | 220/374 X |
| 4,136,796 | 1/1979 | Dubois et al. | 220/303 X |
| 4,922,954 | 5/1990 | Blomquist et al. | 220/203.16 X |
| 5,152,419 | 10/1992 | Yanagi | 220/374 |
| 5,388,615 | 2/1995 | Edlund et al. | 220/203.18 X |
| 5,499,654 | 3/1996 | Shefte | 220/203.16 X |
| 5,649,639 | 7/1997 | Dolvet et al. | 220/203.11 X |

FOREIGN PATENT DOCUMENTS

| 25 01 228 | 7/1975 | Germany . |
| 296 08 342 | 8/1996 | Germany . |

*Primary Examiner*—Stephen K. Cronin
*Assistant Examiner*—Nathan Newhouse
*Attorney, Agent, or Firm*—Young & Thompson

[57] ABSTRACT

A plastic vent valve (1) for containers for transporting and storing liquids has a cylindrical valve housing(2) which is made as a threaded plug (3) and is screwed onto a screw cover (8) for closing an opening of a plastic inner container of a palletized container. The valve has a valve membrane (4), a surge disk (5), a surge cover (6), and a sealing cap (7).

11 Claims, 2 Drawing Sheets

PLASTIC VENT VALVE FOR CONTAINERS

FIELD OF THE INVENTION

The invention relates to a plastic vent valve for containers for transport and storage of liquids, which is integrated into a screw cap or a screw plug for closing the fill and/or drain opening and/or the vent and/or bleeder valve of a container and which has a valve housing made as a threaded plug which can be screwed into a corresponding threaded hole of the screw cap or threaded plug, and which has a valve opening which can be opened and closed by a valve membrane, as well as a splash guard for the valve membrane to protect against the liquid stored and transported in the container.

BACKGROUND OF THE INVENTION

DE 296 08 342.9 U1 discloses a vent valve of this type in which the valve membrane is held by a clamp disk with air passage openings in the valve housing which is designed to be used at the same time for protection of the valve membrane against penetration of liquid from the tank into the valve for surge vibrations which occur during transport. Practice shows that the clamp disk does not adequately perform this protective function, since during transport the liquid can enter the valve housing and due to the suction action exerted by the liquid the valve membrane opens and liquid emerges from the container via the vent valve. Another major disadvantage of the known vent valve is that the valve membrane does not have the pressure tightness prescribed for transport and storage containers for liquids at a container pressure of 1 bar.

DE 25 01 228 A1 describes a closing cap which is designed for liquid containers, which can be screwed onto a drum neck and into which a safety valve which acts as a ventilation and bleeder valve is integrated which responds to overpressure and underpressure in the container. In this safety valve a valve disk of elastic material which is highly prestressed during installation and thus assumes the shape of a spherical segment is used. In this valve there is the danger of loss of tightness as a result of fatigue phenomena of the valve disk material during prolonged use.

SUMMARY OF THE INVENTION

The object of the invention is to develop a vent valve of the generic type which satisfies the highest safety requirements.

The object is achieved as claimed in the invention by a vent valve with the herein claimed features.

The subclaims contain advantageous developments of the invention.

The safety valve as claimed in the invention is characterized by extremely high functional safety and satisfies the prescribed safety guidelines.

BRIEF DESCRIPTION OF THE DRAWINGS

The invention is explained below using drawings which represent the following.

DETAILED DESCRIPTION OF THE INVENTION

Figure 1:
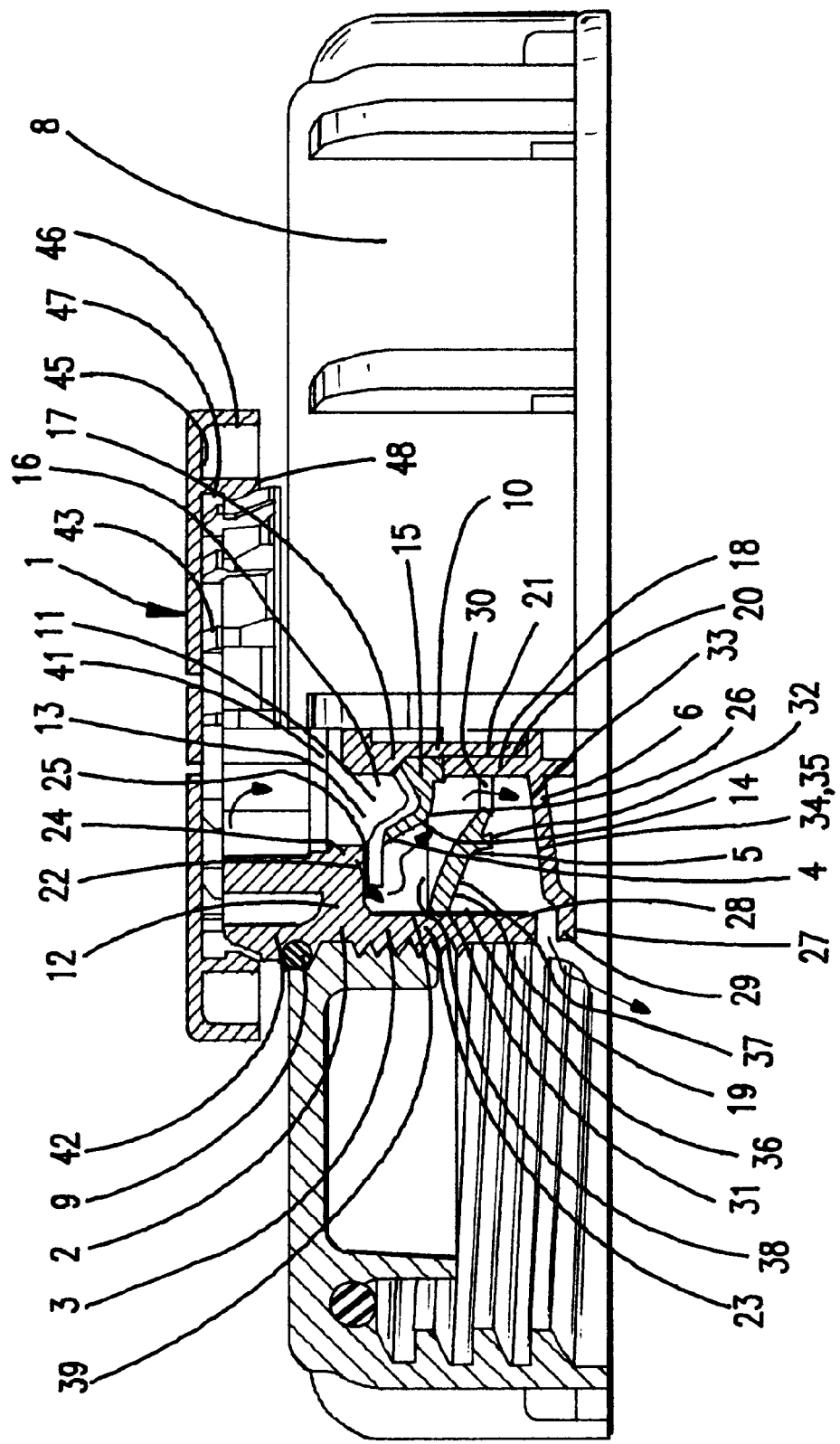
FIG. 1 shows a longitudinal section of a vent valve and
FIG. 2 shows an overhead view of the valve as shown in FIG. 1 without the sealing cap.
Figure 2:
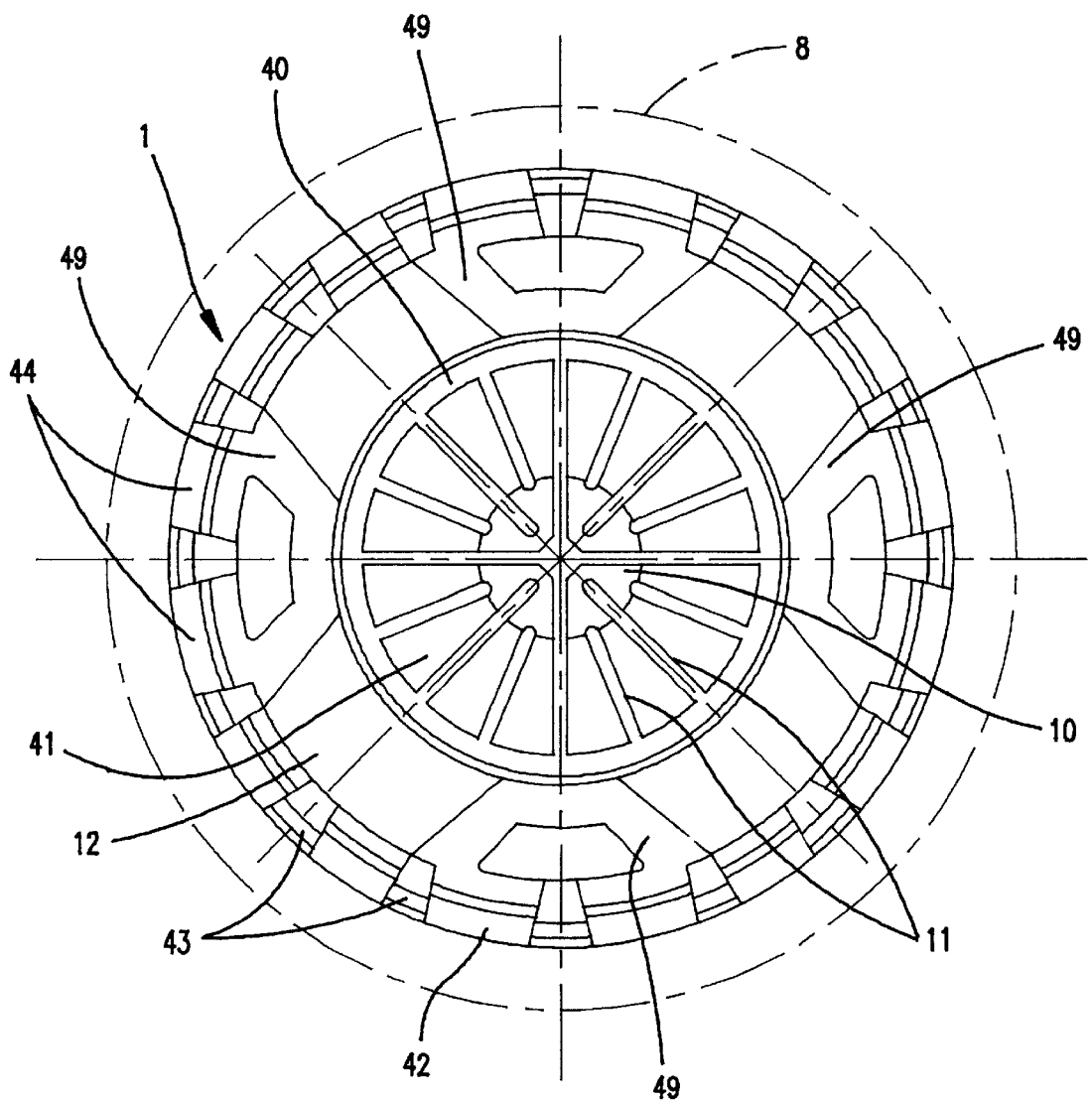

Plastic vent valve 1 as shown in FIGS. 1 and 2 for tanks, casks, palletized drums and similar containers for liquid storage and transport consists of cylindrical valve housing 2 made as threaded plug 3, valve membrane 4, surge disk 5, surge cover 6 and sealing cap 7.

Threaded plug 3 which is screwed into plastic screw cap 8 for example for closing the fill opening of the plastic inner container of a palletized drum and which is sealed in screw cap 8 by means of sealing ring 9, has central hub 10 which is held by ribs 11 which extend in a star shape from hub 10 to the outside to annular collar 12. Air passage openings 13 are formed between retaining ribs 11.

Elastic valve membrane 4 for opening and closing air passage openings 13 which is made of a flexible material like plastic or rubber which is resistant to corrosive liquids, with the corresponding additives, is made as hat profile 14 and has central, reinforced attachment hub 15. Valve membrane 4 is pushed onto hub 10 as far as shoulder 17 of the latter, with hat profile opening 16 pointing towards annular collar 12 of valve housing 2.

Valve membrane 4 is held by means of surge cover 6 pressed onto inner end 18 of hub 10 on the cover. Clamp sleeve 20 with axial clamp fins 21 is molded onto arched surge cover 6 and presses valve membrane 4 with attachment hub 15 against shoulder 17 of hub 10 of valve housing 2, such that valve membrane 4 in the closed position of valve 1 rests with annular edge 22 under prestress against inside 23 of annular collar 12 of valve housing 2, the collar forming the valve seat. Valve membrane 4 is also supported by annular fin 25 molded onto one inner edge 24 of annular collar 12.

Retaining ribs 11 of hub 10 have profile 26 matched to hat profile 14 of valve membrane 4 for supporting the latter at a container overpressure which may not exceed 1 bar according to approval guidelines.

Outside edge 27 of surge cover 6 forms with inner end 28 of valve housing 2 peripheral passage slot 29 for the air entering the container with valve 1 opened.

Between valve membrane 4 and surge cover 6 coaxially to the membrane and cover, surge disk 5 made as hat profile 19 with center passage 30 is inserted. Surge disk 5 together with surge cover 6 forms a labyrinth seal as protection for valve membrane 4 against the surge liquid penetrating into valve 1. Surge disk 5 which is installed in valve housing 2 with hat profile opening 31 pointing toward valve membrane 4 forms drain surface 32 for the surge liquid entering valve 1.

In the same way arch 33 of surge cover 6 which is pointed towards valve membrane 4 forms drain surface 34 for the surge liquid entering vent valve 2.

On outside 35 of surge cover 6 are molded axial clamp projections 36 distributed over the periphery of the cover with clamp edges 37 matched to hat profile 19 of surge disk 5 for pressing the latter against shoulder 38 on inside 39 of valve housing 2.

On outside 40 of annular collar 12 of valve housing 2 plastic lattice 41 is welded and covers air passage openings 13 between retaining ribs 11 of hub 10 as protection against penetration of insects.

Hook-shaped retaining teeth 43 for sealing cap 7 which can be clamped securely onto them are molded to outer edge 42 of valve housing 2, the edge being adjacent to annular collar 12, between retaining teeth 43 and sealing cap 7 which projects above them to the outside, passage openings 44 being formed for the air flowing into the container through vent valve 1 with valve membrane 4 opened. Molded to inside 45 of sealing cap 7 at a radial distance from its outer edge 46 is annular fin 47 with undercut 48 which, when sealing cap 7 is clamped onto valve housing 2, locks to retaining teeth 43 thereof.

Four shaped segments 49 on outside 40 of annular collar 12 are used to mount a lug wrench when screwing vent valve 1 on and off screwed cap 8.

When negative pressure occurs in the tank when liquid is being removed, valve membrane 4 of vent valve 1 opens so that air can flow into the tank via air passage openings 44, 13, 30 and 29 in the arrow direction shown in FIG. 1.

I claim:

1. Plastic vent valve for containers for transporting and storing liquids, and adapted to be inserted into a screw cap or a screw plug for closing an opening of a container, the valve having a cylindrical valve housing comprised of a threaded plug for screwing into a corresponding threaded hole of the screw cap or screw plug, and a valve opening which can be opened and closed by a valve membrane and a splash guard for the valve membrane to protect against the liquid stored and transported in the container, wherein the cylindrical valve housing has a central hub which is held by ribs, said ribs extending in a star shape from the hub outwardly to an annular collar and air passage openings being formed between said ribs, said elastic valve membrane constructed and arranged to open and close said air passage openings between said ribs, said valve membrane having a hat profile with a hat profile opening pointing towards the annular collar of said valve housing and in a closed position abuts with an annular edge of the annular collar of the valve housing, the collar forming a valve seat, a surge cover placed on an inner end of the hub and having an outside edge which forms with an inner end of the valve housing, a peripheral passage slot for air entering the container and which is used to hold the valve membrane to the hub, a surge disk with at least one passage opening for air inserted between the valve membrane and the surge cover and together with the surge cover forming a labyrinth seal for protection of the valve membrane against liquid penetrating into the valve housing, and retaining segments on an outer edge of the valve housing for securing a sealing cap, the outer edge of the annular collar having between the retaining segments, outside passage openings for air flowing into the container through the valve housing with the valve membrane opened.

2. Vent valve as claimed in claim 1, wherein the valve membrane is made of a flexible material which is resistant to corrosive liquids.

3. Vent valve as claimed in claim 1, wherein a clamp sleeve extends toward the valve membrane from the surge cover and presses the valve membrane against a shoulder of the hub of the valve housing and wherein an arch of the surge cover pointing towards the valve membrane forms a drain surface for liquid which has entered the valve housing.

4. Vent valve as claimed in claim 1, wherein the surge disk has a hat profile with said passage opening for air being located in the center.

5. Vent valve as claimed in claim 1, further comprising axial clamp projections on an outside of the surge cover and distributed over a periphery of the cover with clamp edges matched to a hat profile of the surge disk for pressing the surge disk against a shoulder on the valve housing.

6. Vent valve as claimed in claim 1, wherein the surge disk has a hat profile pointing toward the valve membrane and forms a drain surface for liquid entering the valve housing.

7. Vent valve as claimed in claim 1, wherein the retaining segments are hook-shaped retaining teeth for securely clamping with an undercut on an annular fin extending from the sealing cap.

8. Vent valve as claimed in claim 1, wherein the ribs of the hub have a profile matched to said hat profile of the valve membrane for supporting the valve membrane at a container overpressure.

9. Vent valve as claimed in claim 8, wherein the valve membrane is also supported by an annular fin molded onto an inner edge of the annular collar of the valve housing.

10. Vent valve as claimed in claim 1, further comprising lattice attached to the annular collar of the valve housing, and which covers the air passage openings between the ribs of the hub as protection against penetration of insects.

11. Vent valve as claimed in claim 10, wherein the lattice is welded to the annular collar.

* * * * *